(12) United States Patent
Wang et al.

(10) Patent No.: US 12,474,035 B2
(45) Date of Patent: Nov. 18, 2025

(54) LIGHTING DEVICE WITH REGIONS OF DIFFERING SPECTRAL RANGES

(71) Applicant: DELTA ELECTRONICS, INC., Taoyuan (TW)

(72) Inventors: Chih-Hsien Wang, Taoyuan (TW); Po-Yen Chen, Taoyuan (TW); Ming-Chieh Cheng, Taoyuan (TW); Shih-Chieh Chang, Taoyuan (TW); Kuan-Hsien Tu, Taoyuan (TW); Pin-Chen Lai, Taoyuan (TW); Xiu-Yi Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 18/299,731

(22) Filed: Apr. 13, 2023

(65) Prior Publication Data
US 2023/0383929 A1    Nov. 30, 2023

Related U.S. Application Data

(60) Provisional application No. 63/384,234, filed on Nov. 18, 2022.

(30) Foreign Application Priority Data

Apr. 13, 2022 (CN) .......................... 202210385130.6

(51) Int. Cl.
*F21V 19/00* (2006.01)
*F21Y 105/12* (2016.01)
(Continued)

(52) U.S. Cl.
CPC ....... *F21V 19/0015* (2013.01); *F21Y 2105/12* (2016.08); *F21Y 2105/16* (2016.08); *F21Y 2105/18* (2016.08); *F21Y 2113/13* (2016.08)

(58) Field of Classification Search
CPC .............. F21Y 2105/12; F21Y 2113/10; F21Y 2113/13
See application file for complete search history.

(56) References Cited

U.S. PATENT DOCUMENTS 8,835,931 B2 * 9/2014 Wirth .................. H01L 25/0753
438/34
10,718,474 B1 * 7/2020 Von Fange ................ F21K 9/23
(Continued)

FOREIGN PATENT DOCUMENTS

AU     2021106215 A4    10/2021
CN      203671357 U     6/2014
(Continued)

*Primary Examiner* — James R Greece
*Assistant Examiner* — Michael Chiang
(74) *Attorney, Agent, or Firm* — CKC & Partners Co., LLC

(57) ABSTRACT

A lighting device includes a board, first light emitting elements and second light emitting elements. The first light emitting elements emit lights in a first spectral range. The second light emitting elements emit lights in a second spectral range. The second spectral range is narrow than the first spectral range. The first light emitting elements are disposed in at least one first area of the board, and the second light emitting elements are disposed in second areas of the board. The at least one first area and the second areas are alternatively arranged on the board.

9 Claims, 12 Drawing Sheets

(51) Int. Cl.
*F21Y 105/16* (2016.01)
*F21Y 105/18* (2016.01)
*F21Y 113/13* (2016.01)

(56) References Cited

U.S. PATENT DOCUMENTS

| | | | | |
|---|---|---|---|---|
| 11,398,524 | B2* | 7/2022 | Chu | H05B 45/48 |
| 11,644,189 | B2* | 5/2023 | Wen | F21V 23/0442 |
| | | | | 315/130 |
| 11,767,964 | B2* | 9/2023 | Vilem | F21V 5/007 |
| | | | | 362/311.02 |
| 2008/0084694 | A1* | 4/2008 | Rose | F21V 5/04 |
| | | | | 362/296.07 |
| 2013/0200817 | A1 | 8/2013 | Gray et al. | |
| 2014/0197431 | A1* | 7/2014 | Oka | H01L 33/50 |
| | | | | 257/88 |
| 2014/0254153 | A1* | 9/2014 | Vissenberg | F21V 7/0016 |
| | | | | 362/235 |
| 2015/0228868 | A1* | 8/2015 | Ouderkirck | F21V 7/00 |
| | | | | 362/84 |
| 2015/0276150 | A1* | 10/2015 | Takei | F21V 23/006 |
| | | | | 362/231 |
| 2017/0191637 | A1* | 7/2017 | Gommans | F21V 5/002 |
| 2018/0280717 | A1 | 10/2018 | Ceder et al. | |
| 2019/0235257 | A1* | 8/2019 | Mao | F21V 5/043 |
| 2019/0239308 | A1* | 8/2019 | Lee | H05B 45/20 |
| 2020/0008278 | A1 | 1/2020 | Bouchard et al. | |
| 2021/0105873 | A1* | 4/2021 | Francis | H05B 45/20 |

FOREIGN PATENT DOCUMENTS

| | | |
|---|---|---|
| CN | 109890113 A | 6/2019 |
| CN | 111629490 A | 9/2020 |
| CN | 107023757 B | 10/2020 |
| CN | 213040507 U | 4/2021 |
| CN | 214745043 U | 11/2021 |
| TW | 201028592 A | 8/2010 |
| TW | 201349927 A | 12/2013 |
| TW | 201433736 A | 9/2014 |
| TW | 201448666 A | 12/2014 |
| TW | I580890 B | 5/2017 |

\* cited by examiner

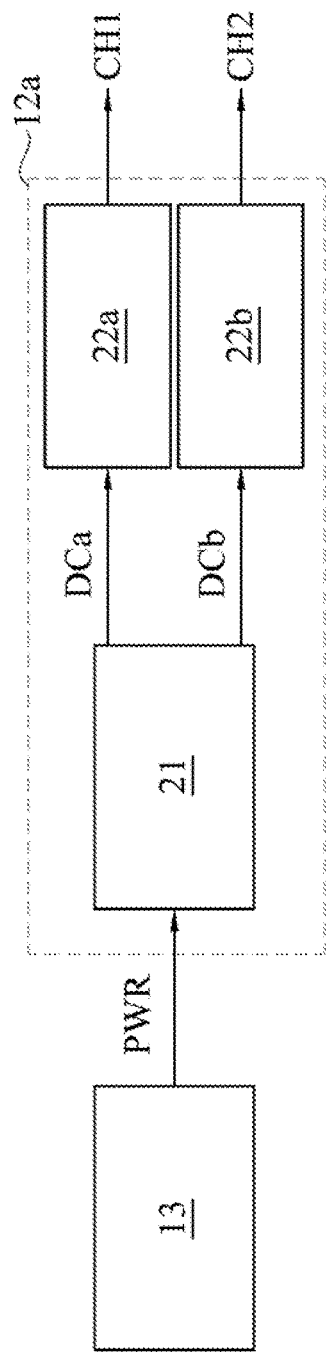
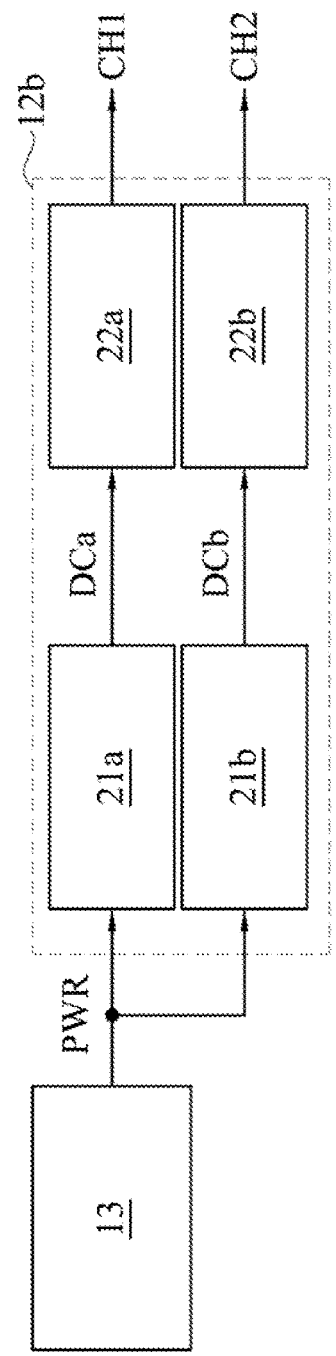
Fig. 2A
Fig. 2B

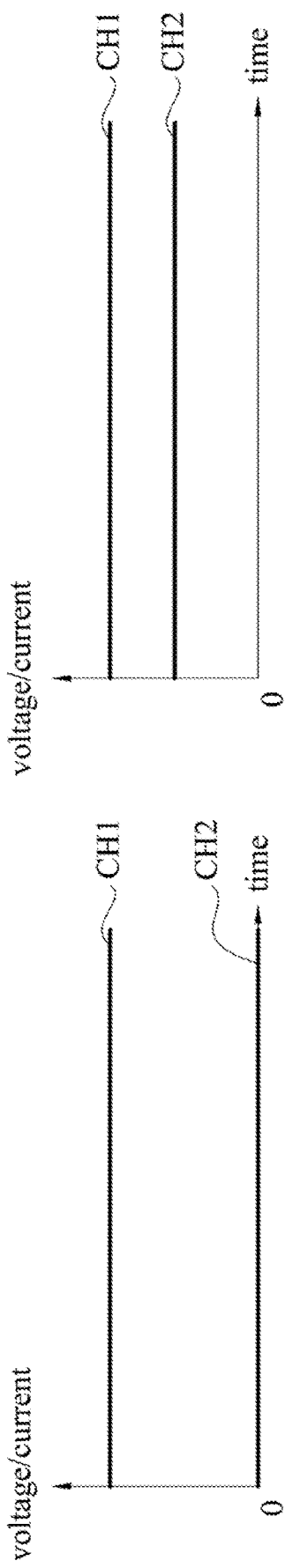
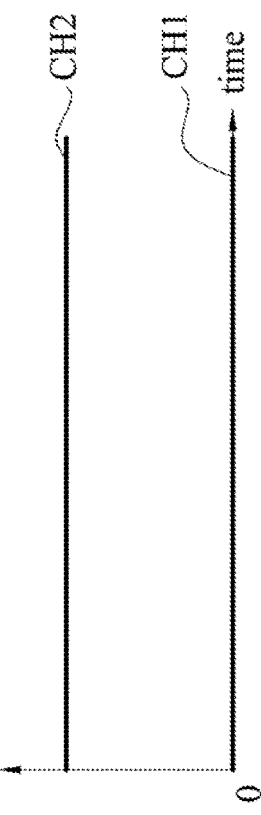

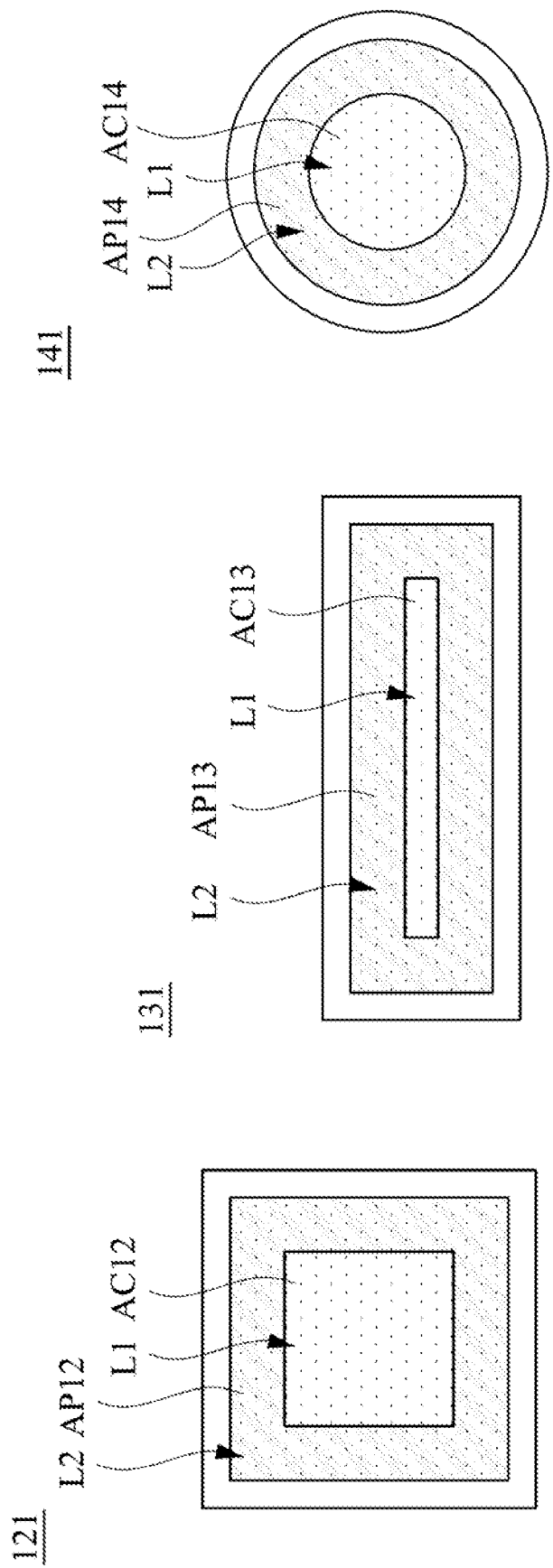

LIGHTING DEVICE WITH REGIONS OF DIFFERING SPECTRAL RANGES

RELATED APPLICATIONS

This application claims priority to U.S. Provisional Application Ser. No. 63/384,234 filed Nov. 18, 2022, and China Application Serial Number 202210385130.6, filed Apr. 13, 2022, the disclosures of which are incorporated herein by reference in their entireties.

BACKGROUND

Field of Invention

The disclosure relates to a lighting device. More particularly, the disclosure relates to a lighting device capable for health care.

Description of Related Art

In nowadays techniques of lamp panel, white lamps are common, such as lamps with color temperature of warm white, cool white or neutral white. However, in some cases, there need to provide lights with a certain wavelength, which may loss advantages about general-purpose luminaires. Therefore, how to provide the lights with the certain wavelength compatible with the advantages about the general-purpose luminaires is an issue deserved to be studied.

SUMMARY

An embodiment of the disclosure provides a lighting device. The lighting device includes a board, a plurality of first light emitting elements and a plurality of second light emitting elements. The first light emitting elements emit lights in a first spectral range. The second light emit elements emit lights in a second spectral range. The second spectral range is narrow than the first spectral range, wherein the first light emitting elements are disposed in at least one first region of the board. The second light emitting elements are disposed in a plurality of second regions of the board, and the at least one first region and the second regions are alternately arranged on the board.

Another embodiment of the disclosure provides a lighting device. The lighting device includes a board, a plurality of first light emitting elements and a plurality of second light emitting elements. The first light elements emit elements emitting lights in a first spectral range. The second light emitting elements emit lights in a second spectral range. The second spectral range is narrow than the first spectral range. The first light emitting elements are disposed in a peripheral region of the board. The second light emitting elements are disposed in a central region of the board. The central region is surrounded by the peripheral region of the board.

The other embodiment of the disclosure provides a lighting device. The lighting device includes a board, a plurality of first light emitting elements and a plurality of second light emitting elements. The first light elements emit elements emitting lights in a first spectral range. The second light emitting elements emit lights in a second spectral range. The second spectral range is narrow than the first spectral range. The first light emitting elements are disposed in a central region of the board. The second light emitting elements are disposed in a peripheral region of the board. The central region is surrounded by the peripheral region of the board.

In summary, the lighting device of the present disclosure is configured with the light emitting elements which emit lights in different spectral ranges, so as to provide the heath care and reduce the strength of negative afterimages caused from the visual fatigue at the same time.

BRIEF DESCRIPTION OF THE DRAWINGS

The disclosure can be more fully understood by reading the following detailed description of the embodiment, with reference made to the accompanying drawings as follows:

FIG. 2A and FIG. 2B are schematic diagrams illustrating light dimming devices according to some embodiments of the present disclosure.

FIG. 3A to FIG. 3C are schematic diagrams illustrating voltages/currents provided by channels of a light dimming device according to some embodiments of the present disclosure.

FIG. 12 to FIG. 14 are schematic diagrams illustrating boards according to some embodiments of the present disclosure.

DETAILED DESCRIPTION

Figure 1:
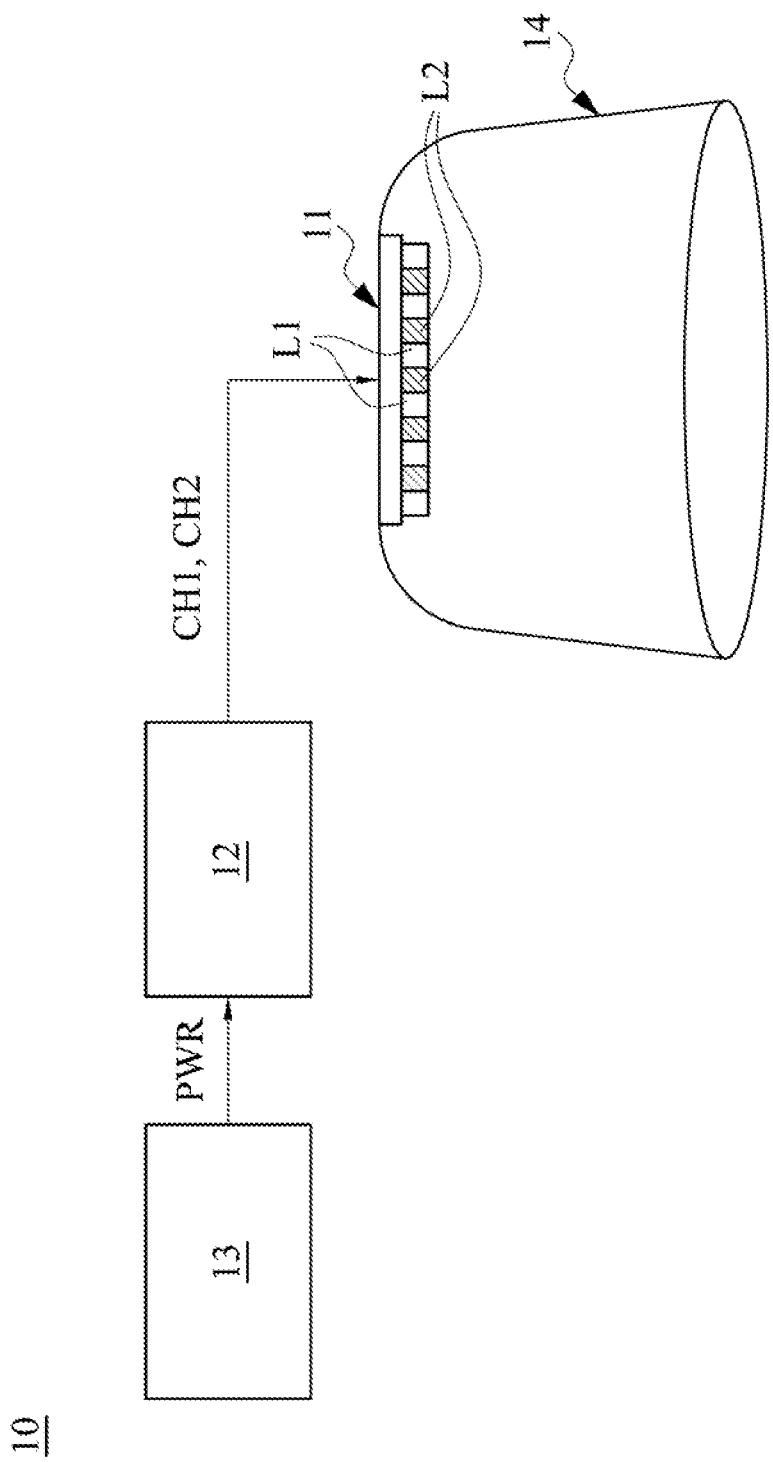
FIG. 1 is a schematic diagram illustrating a lighting device according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. Description of the operation does not intend to limit the operation sequence. Any structures resulting from recombination of elements with equivalent effects are within the scope of the present disclosure. It is noted that, in accordance with the standard practice in the industry, the drawings are only used for understanding and are not drawn to scale. Wherever possible, the same reference numbers are used in the drawings and the description to refer to the same or like parts for better understanding.

Throughout the specification and claims, unless otherwise specified, the terms generally have the ordinary meaning of each term used in the field, in the disclosed content and in the special content. In addition, the terms, "comprising", "including", "having", "containing", "involving" and the like, used herein are open-ended, that is, including but not limited to. It will be understood that, as used herein, the phrase "and/or" includes any and all combinations of one or more of the associated listed items.

FIG. 1 is a schematic diagram illustrating a lighting device 10 according to some embodiments of the present disclosure. As shown in FIG. 1, the lighting device 10 includes a board 11, a light dimming device 12, an electricity source 13, a lamp 14, one or more light emitting elements L1 and one or more light emitting elements L2. In some embodiments, the light emitting elements L1 and the light emitting elements L2 can be implemented by the light emitting diodes and the board 11 can be considered as a light emitting diode light board. In another embodiment, the light emitting elements L1 and the light emitting elements L2 can be implemented by the mini light emitting diodes or light emitting diodes in other size and the board 11 can be considered as mini light emitting diode light board or a light board configured with the light emitting diodes in other size. In the other embodiments, the light emitting elements L1 and the light emitting elements L2 can be implemented by the other elements capable for emitting lights, which is not limited in the present disclosure.

In some embodiments, the light emitting elements L2 emit lights with a specific wavelength or in a specific spectral range, in order to provide corresponding therapy for user. For an example, a spectral range of the lights emitted by the light emitting elements L2 can be implemented by a red light spectrum or a near/far infrared spectrum. That is, the light emitting elements L2 emit the lights in the red light spectrum or the near/far infrared spectrum, in order to prevent/improve symptoms, such as, retinal inflammation and eyesight deterioration. In this case, the light emitting elements L2 can be implemented by the red light emitting diode or near/far infrared light emitting diode. In some embodiments, the spectral range of the lights emitted by the light emitting elements L2 can be implemented by 600 nanometers to 700 nanometers. In some embodiments, the light emitting elements L2 emit lights with a peak wavelength of 660 nanometers.

For another example, a spectral range of the lights emitted by the light emitting elements L2 can be implemented by a range of green light spectrum. That is, the light emitting elements L2 emit the lights in the range of green light spectrum, in order to prevent/improve symptoms, such as, glaucoma. In this case, the light emitting elements L2 can be implemented by the green light emitting diode. In some embodiments, the spectral range of the lights emitted by the light emitting elements L2 can be implemented by 500 nanometers to 570 nanometers.

In the other embodiments, a spectral range of the lights emitted by the light emitting elements L2 can be determined by benefits of health care or therapy to be provided. Therefore, the spectral range of the lights emitted by the light emitting elements L2 can be implemented by the other spectral range, which is not limited in the present disclosure.

When the human visual system receives the lights with a specific wavelength or in a narrow spectral range, negative afterimages may occur because of visual fatigue. Specifically, if human eyes continue staring at a light source with a certain color or reading under an ambient light with the certain color, the stimulation for the human visual system for perceiving the of the certain color lights being weakened is due to the visual fatigue and then when an image with the other color (e.g., white) is viewed by the human visual system, it may occur the negative afterimages about the color compensation. To improve the negative afterimages caused from the visual fatigue of the human visual system for staring at or reading under the certain color lights, the light emitting elements L2 emit lights in the second spectral range, and the light emitting elements L1 emit lights in a first spectral range which is boarder than the said second spectral range, so as to reduce overstimulation resulting in negative afterimages and to provide health care based on the lights with the specific wavelength or in the specific spectral range at the same time. As a result, in some embodiments, the lighting device 10 can be used as a general purpose illumination.

In some embodiments, a spectral range of the light emitting elements L1 can be a range of white light spectrum or visible light spectrum. That is, the light emitting elements L1 emit lights in the range of white light spectrum or visible light spectrum. In other words, the light emitting elements L1 and the light emitting elements L2 have different spectral ranges, the light emitting elements L1 and the light emitting elements L2 emit lights in the different spectral ranges. In some embodiments, a spectral range of the light emitting elements L2 is narrow than a spectral range of the light emitting elements L1, so as to provide health care for the user based on the lights with the specific wavelength or in the specific spectral range and to improve color vision, blurred vision and discomfort at the same time. In some cases, the light emitting elements L1 can be implemented by the white light emitting diode elements. In some embodiments, a spectral range of the light emitting elements L1 can be implemented by 400 nanometers to 800 nanometers.

In some embodiments, a ratio of an output of the light emitting elements L1 emitting lights in a broader spectral range to an output of the light emitting elements L2 emitting lights in a narrow spectral range is between 100 to 1 and 1 to 1, so as to avoid or decrease user's visual perception for the lights emitted by the light emitting elements L2 in the narrow spectral range.

In some embodiments, the light emitting elements L1 have a color temperature between 2700K~6500K and cooperate with the second light emitting elements L2 to make the lighting device 10 emit with a color temperature above 1500K. The configuration of the light emitting elements L1 can provide a higher color temperature, so that the lighting device 10 can be used as a general purpose illumination.

In some embodiments, the electricity source 13 can be implemented by main electricity or alternating current power. In other embodiments, the electricity source 13 can be implemented by direct current power. In some embodiments, the electricity source 13 provides the direct current/alternating current power PWR to the light dimming device 120.

In some embodiments, the light dimming device 12 is configured to convert the direct current/alternating current power PWR to the outputs of the two channels CH1 and CH2 in order to respectively drive the light emitting elements L1 and L2 on the board 11 to emit lights.

Reference is made to FIG. 1, FIG. 2A and FIG. 2B. FIG. 2A and FIG. 2B are schematic diagrams illustrating light dimming devices 12a and 12b according to some embodiments of the present disclosure. In some embodiments, the light dimming device 12 in FIG. 1 corresponds to the light dimming device 12a or 12b. As shown in FIG. 2A, the light dimming device 12a includes a power conversion circuit 21, direct current voltage/current generating circuits 22a and 22b. In some, embodiments, the power conversion circuit 21 can be implemented by alternating current to direct current conversion circuit or direct current to direct current conversion circuit, so as to buck and rectifier the power PWR transmitted from the electricity source 13 and output direct currents DCa and DCb to the direct current voltage/current generating circuits 22a and 22b.

In some embodiments, each of the direct current voltage/current generating circuits 22a and 22b includes direct current to alternating current conversion circuit, a rectifier and a current control circuit. In some embodiments, the above mentioned direct current to alternating current conversion circuit can be implemented by half-bridge direct current to alternating current converter, full-bridge direct current to alternating current converter, class-E converter or other circuit with the similar functions. In some embodiments, the above mentioned current control circuit can control the switching frequency of the switches included in the said direct current to alternating current conversion circuit to transmit a pulse current to the rectifier, such that the rectifier convert the pulse current to direct current voltage/current.

In some embodiments, the direct current voltage/current generating circuit 22a controls/adjusts a voltage/current amplitude of the direct current voltage/current transmitted to the light emitting elements L1, and the direct current voltage/current generating circuit 22b controls/adjusts a voltage/current amplitude of the direct current voltage/current transmitted to the light emitting elements L2, so as to respectively drive the light emitting elements L1 and L2 to emit lights with the same luminous intensity or with different luminous intensities according to the direct current voltage/currents transmitted by the channels CH1 and CH2.

As shown in FIG. 2B, the light dimming device 12a includes the power conversion circuits 21a and 21b, the direct current voltage/current generating circuits 22a and 22b. In some embodiments, the power conversion circuits 21a and 21b are configured to respectively buck and rectifier the power PWR transmitted from the electricity source 13 and output the direct currents DCa and DCb to the direct current voltage/current generating circuits 22a and 22b. In other embodiments, the light dimming device 12 in FIG. 1 can be implemented by the other circuit with the same/similar functions, which is not limited in the present disclosure.

Reference is made to FIG. 1, FIG. 2 and FIG. 3A to FIG. 3C. FIG. 3A to FIG. 3C are schematic diagrams illustrating voltages/currents provided by channels CH1 and CH2 of a light dimming device 12 according to some embodiments of the present disclosure.

As shown in FIG. 3A, in a pure white light mode, the amplitude of voltage/current transmitted by the channel CH1 is greater than 0 volts/amperes and the amplitude of voltage/current transmitted by the channel CH2 is smaller to 0 volts/amperes, so as to control the light emitting elements L1 to emit lights and to control the light emitting elements L2 being in a dark state, such that the lighting device 10 provides a white light illumination.

As shown in FIG. 3B, in a health care mode, the amplitude of voltages/currents transmitted by the channels CH1 and CH2 are greater than 0 volts/amperes, and a ratio of the amplitude of voltage/current transmitted by the channel CH2 to the amplitude of voltage/current transmitted by the channel CH1 is between 1 to 100 and 1 to 1, in order to control the light emitting elements L1 and L2 to emit lights with the same luminous intensity or with different light intensities at the same time. As a result, the lighting device 10 can reduce strength of negative afterimages and provide the health care based on the lights with the specific wavelength or in the specific spectral range at the same time.

In some embodiments of FIG. 3B, the light emitting elements L1 are controlled to emit lights with a larger luminous intensity and the light emitting elements L2 are controlled to emit lights with a smaller luminous intensity, so as to reduce the user's visual perception for the specific wavelength of the lights emitted by the light emitting elements L2, and to use the lighting device 10 as a general purpose illumination. In other words, the luminous intensities of the light emitting elements L1 and the light emitting elements L2 are controlled to cause the user's visual to be hard to perceived the lights emitted by the light emitting elements L2 with the specific wavelength and the lighting device 10 can be used as a general purpose illumination on a basis of the white lights.

As shown in FIG. 3C, in a therapy mode, the voltage/current transmitted by the channel CH2 is greater than 0 volts/amperes, and the voltage/current transmitted by the channel CH1 is similar to 0 volts/amperes, in order to control the light emitting elements L2 to emit lights and to control the light emitting elements L1 being a dark state to provide the specific light for the user.

To be noted that, in some embodiments of FIG. 1, the one or more light emitting elements L1 and the one or more light emitting elements L2 are alternately arranged on the board 11. In some embodiments of the other figures, there are the other configurations/arrangements of the light emitting elements L1 and the light emitting elements L2, it will be discussed in detailed in the following embodiments.

Figures 4, 5:
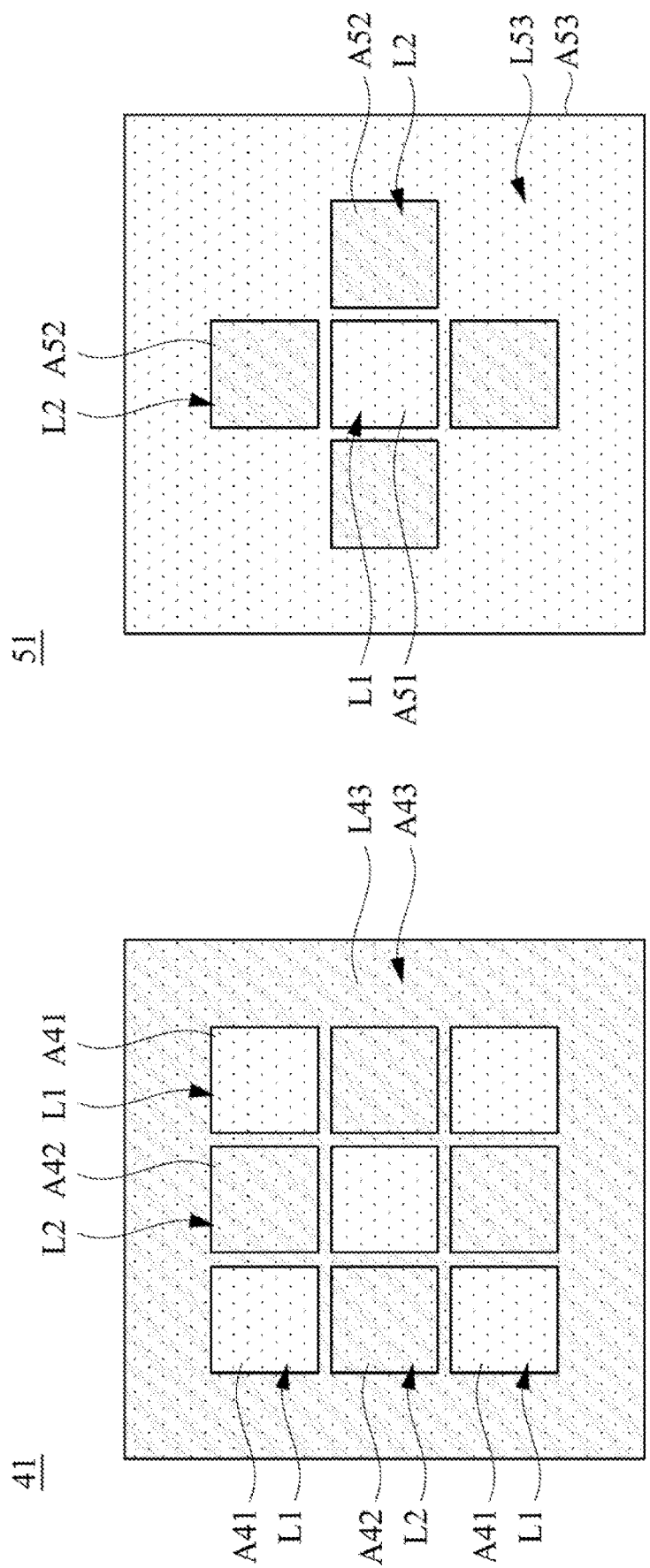
FIG. 4 and FIG. 5 are schematic diagrams illustrating boards according to some embodiments of the present disclosure.

Reference is made to FIG. 4 and FIG. 5. FIG. 4 and FIG. 5 are schematic diagrams illustrating boards 41 and 51 according to some embodiments of the present disclosure. In some embodiments, the board 11 in FIG. 1 can be implemented by the board 41 of FIG. 4 or the board 51 of FIG. 5.

As shown in FIG. 4, the board 41 includes multiple regions A41 for disposing the light emitting elements L1, multiple regions A42 for disposing the light emitting elements L2 and a region A43 for disposing the light emitting elements L43, respectively. The regions A41 and A42 are surrounded by the region A43. The regions A41 and A42 are square/rectangle in shape, and the regions A41 and A42 are alternately arranged in the board 41. In some embodiments, the regions A41 and A42 are alternately arranged in a checkerboard pattern in a central region of the board 41. In some embodiments, the regions A43 can be a rectangular ring region or a circular ring region, such that the light emitting elements L43 are arranged in a hollow rectangle or a hollow circle in shape on the board 41. Specifically, a ratio of a density of the light emitting elements L1 included in each of the regions A41 to a density of the light emitting elements L2 included in each of the regions A42 is between 1 to 1 and 100 to 1. In some cases, an area of each of the regions A41 is substantially the same with an area of each of the regions A42. In some embodiments, a total area of the regions A41 is the same or different from a total area of the regions A42.

In embodiments of FIG. 4, the light emitting elements L1 emit lights in a boarder spectral range, the light emitting elements L43 and L2 have the same specification to emit lights with the specific wavelength or in the narrow spectral range. Both of the light emitting elements L43 and L2 are driven by the voltage/current of the channel CH2, and therefore the board 41 can improve the health care and decrease the visual fatigue at the same time.

As shown in FIG. 5, the board 51 includes at least one region A51 for disposing the light emitting elements L1, multiple regions A52 for disposing the light emitting elements L2 and a region A53 for disposing the light emitting elements L53. The at least one region A51 and the regions A52 are surrounded by the region A53. The regions A51 and A52 are rectangle in shape, and the regions A51 and A52 are alternately arranged on the board 51. In some embodiments, the regions A51 and A52 are alternately arranged on a central region of the board 51, and the regions A51 and A52 are arranged in a cross shape on the central region of the board 51. Specifically, a ratio of a density of the light emitting elements L1 included in the region A51 to a density of the light emitting elements L2 included in each of the regions A52 is between 1 to 1 and 100 to 1. In some cases, an area of each of the regions A51 is substantially the same with an area of each of the regions A52. In some embodiments, a total area of the regions A51 is the same or different from a total area of the regions A52.

In embodiments of FIG. 5, the light emitting elements L2 emit lights in a narrow spectral range, the light emitting elements L1 and L53 have the same specification to emit lights with the specific wavelength or in the boarder spectral range. Both of the light emitting elements L1 and L53 are driven by the voltage/current of the channel CH1, and therefore the board 51 can further reduce the visual fatigue and improve the health care at the same time.

Figure 7:
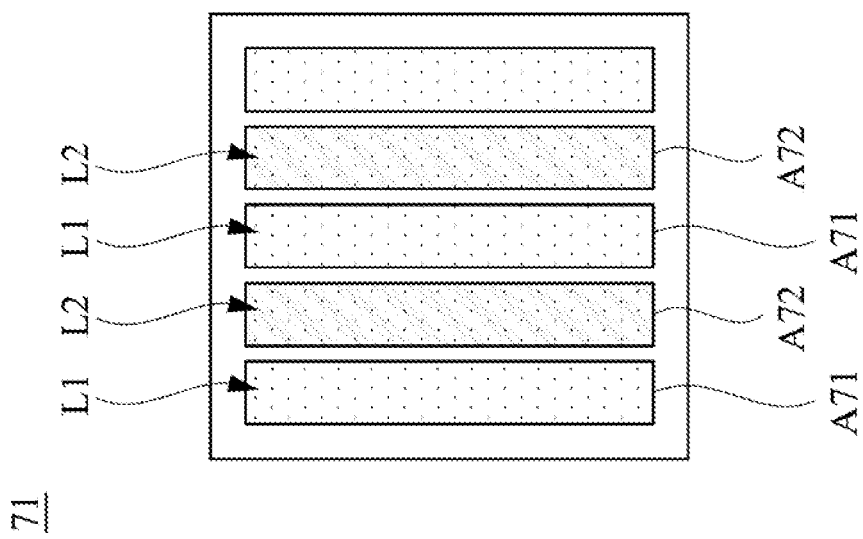
FIG. 6 to FIG. 8 are schematic diagrams illustrating boards according to some embodiments of the present disclosure.
Figure 6:
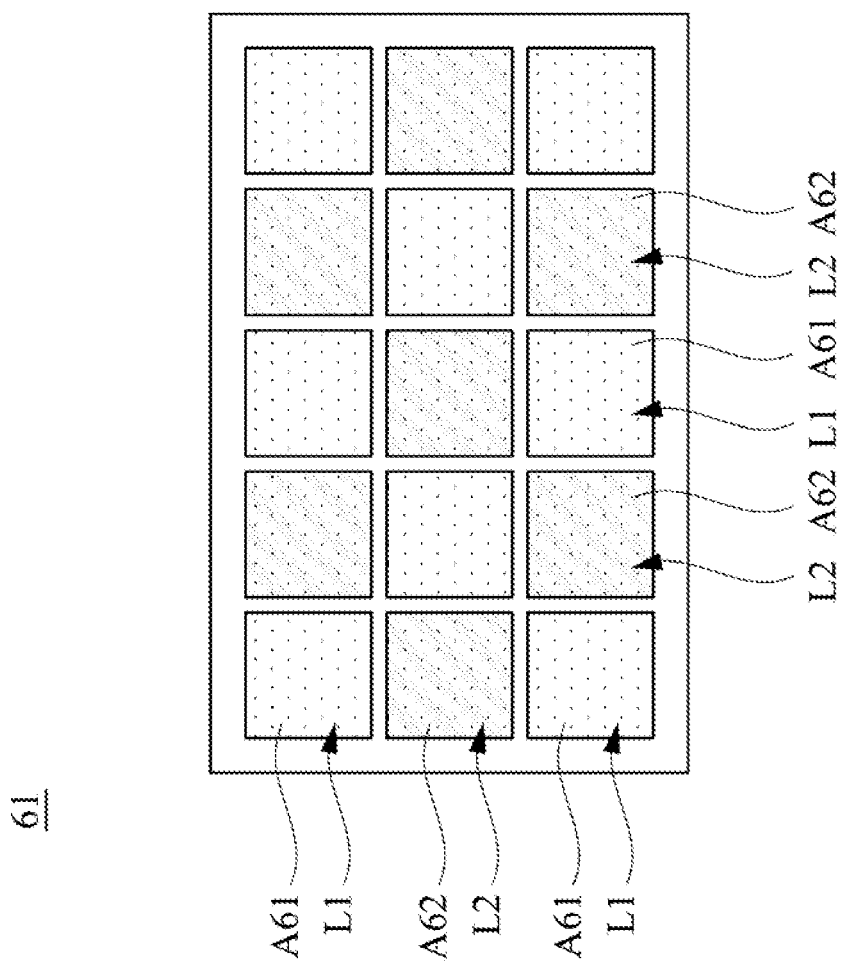
Figure 8:
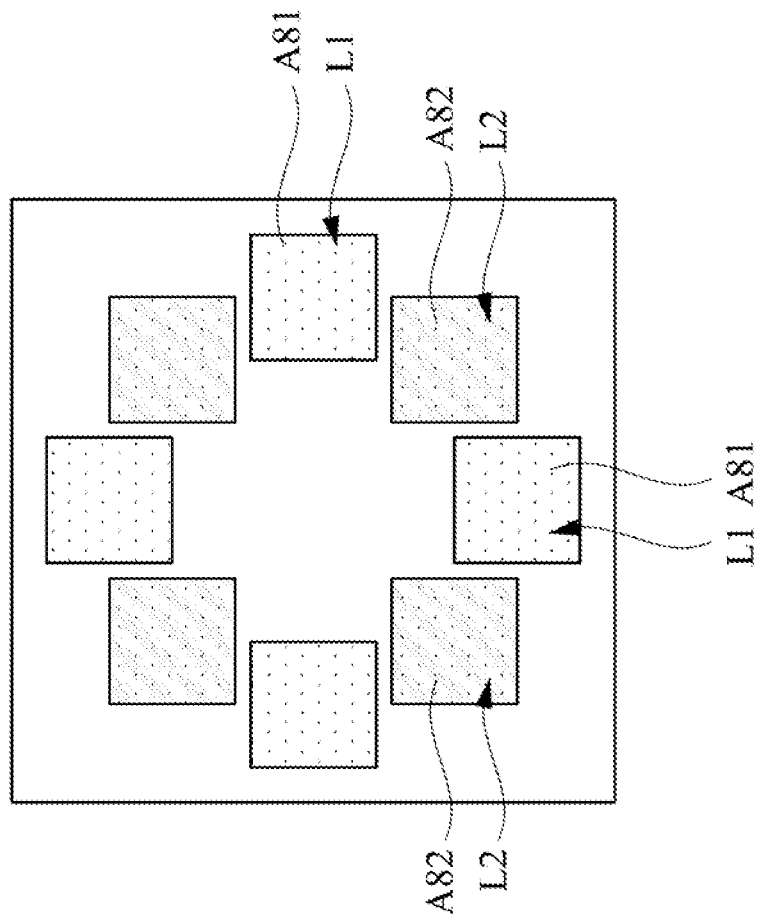

Reference is made to FIG. 6 to FIG. 8. FIG. 6 to FIG. 8 are schematic diagrams illustrating boards 61, 71 and 81 according to some embodiments of the present disclosure. In some embodiments, the board 11 in FIG. 1 can be implemented by the board 71 of FIG. 7, the board 81 of FIG. 8 or the board 91 of FIG. 9.

In the embodiments of FIG. 6, the board 61 includes regions A61 for disposing the light emitting elements L1 and regions A62 for disposing the light emitting elements L2. In some embodiments, the regions A61 and A62 are square/rectangle in shape, and the regions A61 and A62 are arranged in checkerboard pattern on the board 61. Specifically, a ratio of a density of the light emitting elements L1 included in each of the regions A61 to a density of the light emitting elements L2 included in each of the regions A62 is between 1 to 1 and 100 to 1. In some cases, an area of each of the regions A61 is substantially the same with an area of each of the regions A62.

In the embodiments of FIG. 7, the board 71 includes regions A71 for disposing the light emitting elements L1 and regions A72 for disposing the light emitting elements L2. In some embodiments, the regions A71 and A72 are strip line in shape, and the regions A71 and A72 are arranged in row interleaved on the board 71. Specifically, a ratio of a density of the light emitting elements L1 included in each of the regions A71 to a density of the light emitting elements L2 included in each of the regions A72 is between 1 to 1 and 100 to 1. In some cases, an area of each of the regions A71 is substantially the same with an area of each of the regions A72.

In the embodiments of FIG. 8, the board 81 includes regions A81 for disposing the light emitting elements L1 and regions A82 for disposing the light emitting elements L2. In some embodiments, the regions A81 and A82 are square/rectangle in shape, and the regions A81 and A82 are arranged in honeycomb pattern on the board 81. Specifically, a ratio of a density of the light emitting elements L1 included in each of the regions A81 to a density of the light emitting elements L2 included in each of the regions A82 is between 1 to 1 and 100 to 1. In some cases, an area of each of the regions A81 is substantially the same with an area of each of the regions A82.

Figure 11:
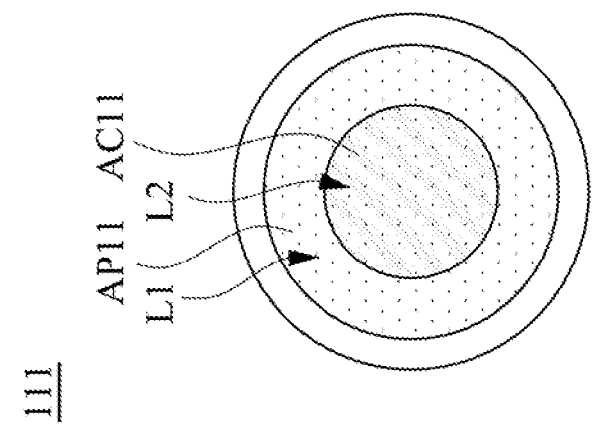
FIG. 9 to FIG. 11 are schematic diagrams illustrating boards according to some embodiments of the present disclosure.
Figure 10:
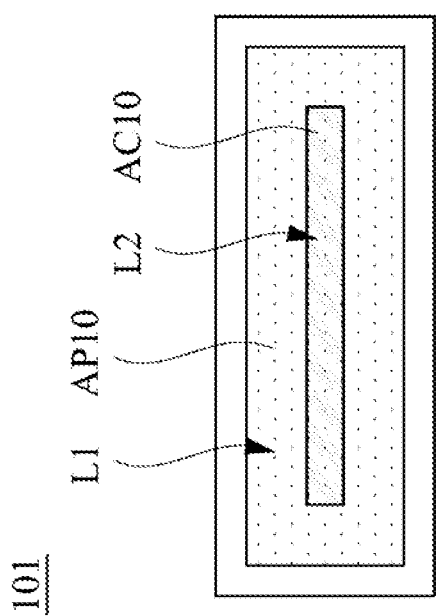
Figure 9:
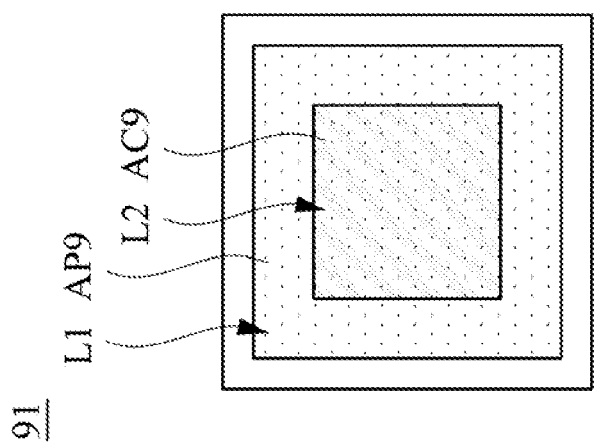

Reference is made to FIG. 9 to FIG. 11. FIG. 9 to FIG. 11 are schematic diagrams illustrating boards 91, 101 and 111 according to some embodiments of the present disclosure. In some embodiments, the board 11 in FIG. 1 can be implemented by the board 91 of FIG. 9, the board 101 of FIG. 10 or the board 111 of FIG. 11.

In the embodiments of FIG. 9, the board 91 is a square board. The board 91 includes a peripheral region AP9 for disposing the light emitting elements L1 and a central region AC9 for disposing the light emitting elements L2. The central region AC9 is square in shape, and the central region AC9 is surrounded by the peripheral region AP9. The peripheral region AP9 is square ring in shape, and the light emitting elements L1 are arranged in hollow square shape on the board 91.

In the embodiments of FIG. 10, the board 101 is a rectangular board. The board 101 includes a peripheral region AP10 for disposing the light emitting elements L1 and a central region AC10 for disposing the light emitting elements L2. The central region AC10 is rectangle in shape, and the central region AC10 is surrounded by the peripheral region AP10. The peripheral region AP10 is rectangular ring in shape, and the light emitting elements L1 are arranged in hollow rectangular shape on the board 101.

In the embodiments of FIG. 11, the board 111 is a circular board. The board 111 includes a peripheral region AP11 for disposing the light emitting elements L1 and a central region AC11 for disposing the light emitting elements L2. The central region AC11 is circle in shape, and the central region AC11 is surrounded by the peripheral region AP11. The peripheral region AP11 is circular ring in shape, and the light emitting elements L1 are arranged in hollow circular shape on the board 111.

In some embodiments, the light emitting elements L1 are disposed in the peripheral region AP9, AP10 or AP11 with a first density, and the light emitting elements L2 are disposed in the central region AC9, AC10 or AC11 with a second density, a ratio of the said first density to the said second density is between 1 to 1 and 100 to 1.

Reference is made to FIG. 12 to FIG. 14. FIG. 12 to FIG. 14 are schematic diagrams illustrating boards 121, 131 and 141 according to some embodiments of the present disclosure. In some embodiments, the board 11 in FIG. 1 can be implemented by the board 121 of FIG. 12, the board 131 of FIG. 13 or the board 141 of FIG. 14.

In the embodiments of FIG. 12, the board 121 is a square board. The board 121 includes a central region AC12 for disposing the light emitting elements L1 and a peripheral region AP12 for disposing the light emitting elements L2. The central region AC12 is square in shape, and the central region AC12 is surrounded by the peripheral region AP12. The peripheral region AP12 is square ring in shape, and the light emitting elements L2 are arranged in hollow square shape on the board 121.

In the embodiments of FIG. 13, the board 131 is a rectangular board. The board 131 includes a central region AC13 for disposing the light emitting elements L1 and a peripheral region AP13 for disposing the light emitting elements L2. The central region AC13 is rectangle in shape, and the central region AC13 is surrounded by the peripheral region AP13. The peripheral region AP13 is rectangle ring in shape, and the light emitting elements L2 are arranged in hollow rectangular shape on the board 131.

In the embodiments of FIG. 14, the board 141 is a circular board. The board 141 includes a central region AC14 for disposing the light emitting elements L1 and a peripheral region AP14 for disposing the light emitting elements L2. The central region AC14 is circle in shape, and the central region AC14 is surrounded by the peripheral region AP14. The peripheral region AP14 is circle ring in shape, and the light emitting elements L2 are arranged in hollow circular shape on the board 141.

In some embodiments, the light emitting elements L1 disposed in the central region AC12, AC13 or AC14 with a first density, and the light emitting elements L2 disposed in the central region AP12, AP13 or AP14 with a second density, a ratio of the said first density to the second density is between 1 to 1 and 100 to 1.

Figure 16:
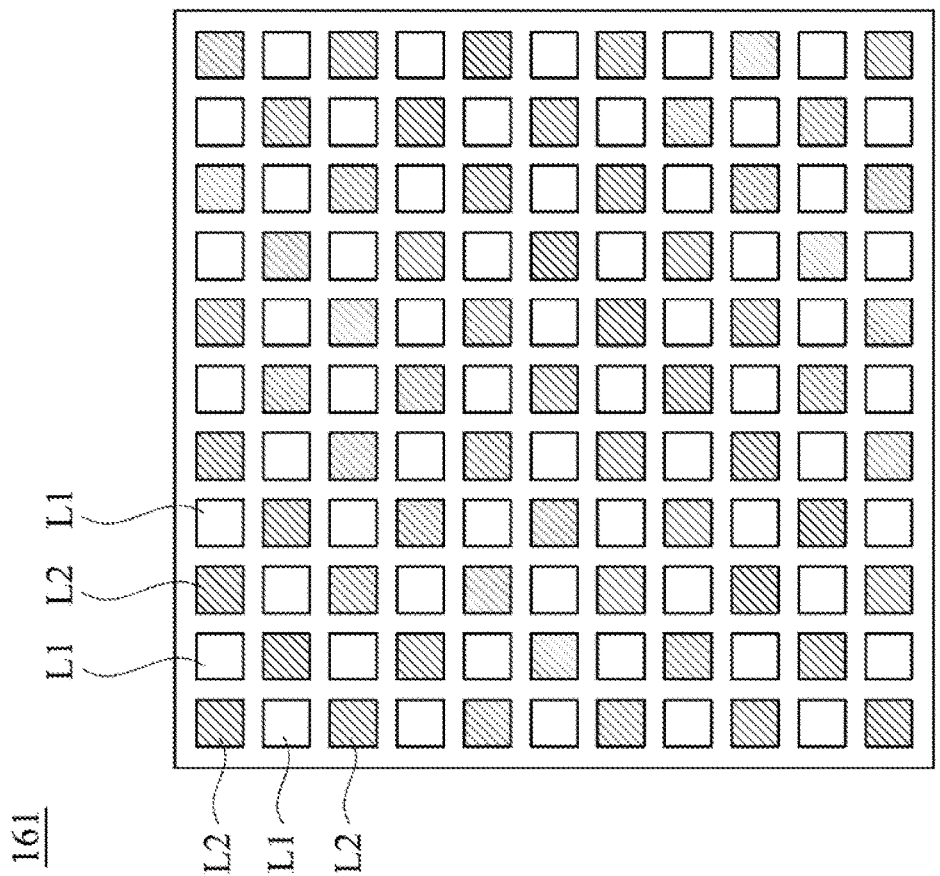
FIG. 15 to FIG. 17 are schematic diagrams illustrating boards according to some embodiments of the present disclosure.
Figure 15:
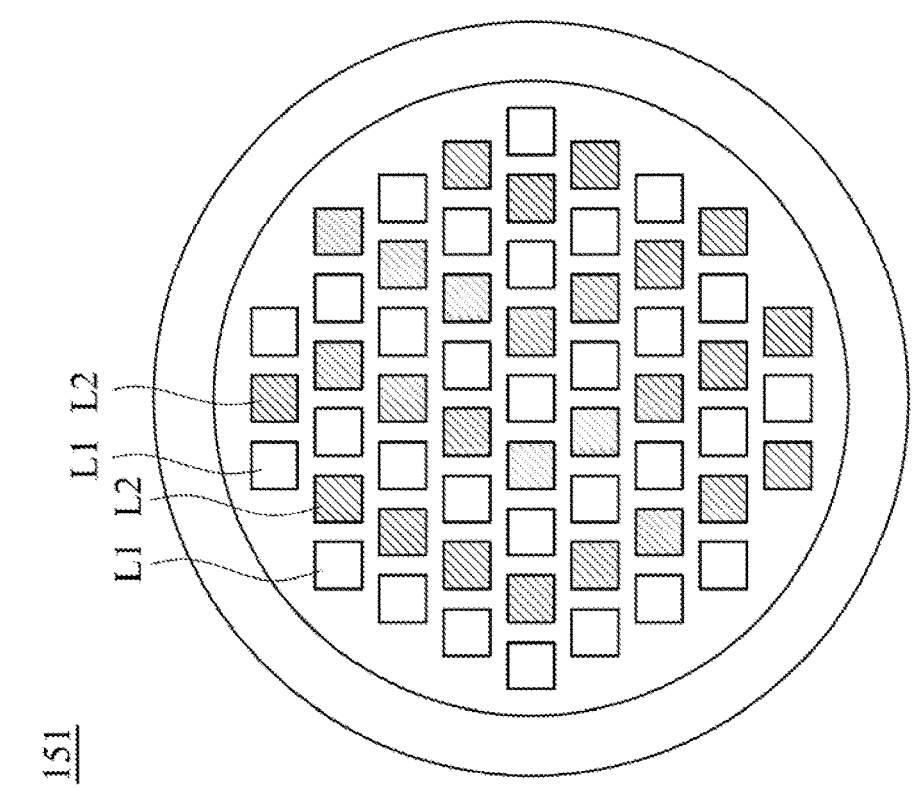
Figure 17:
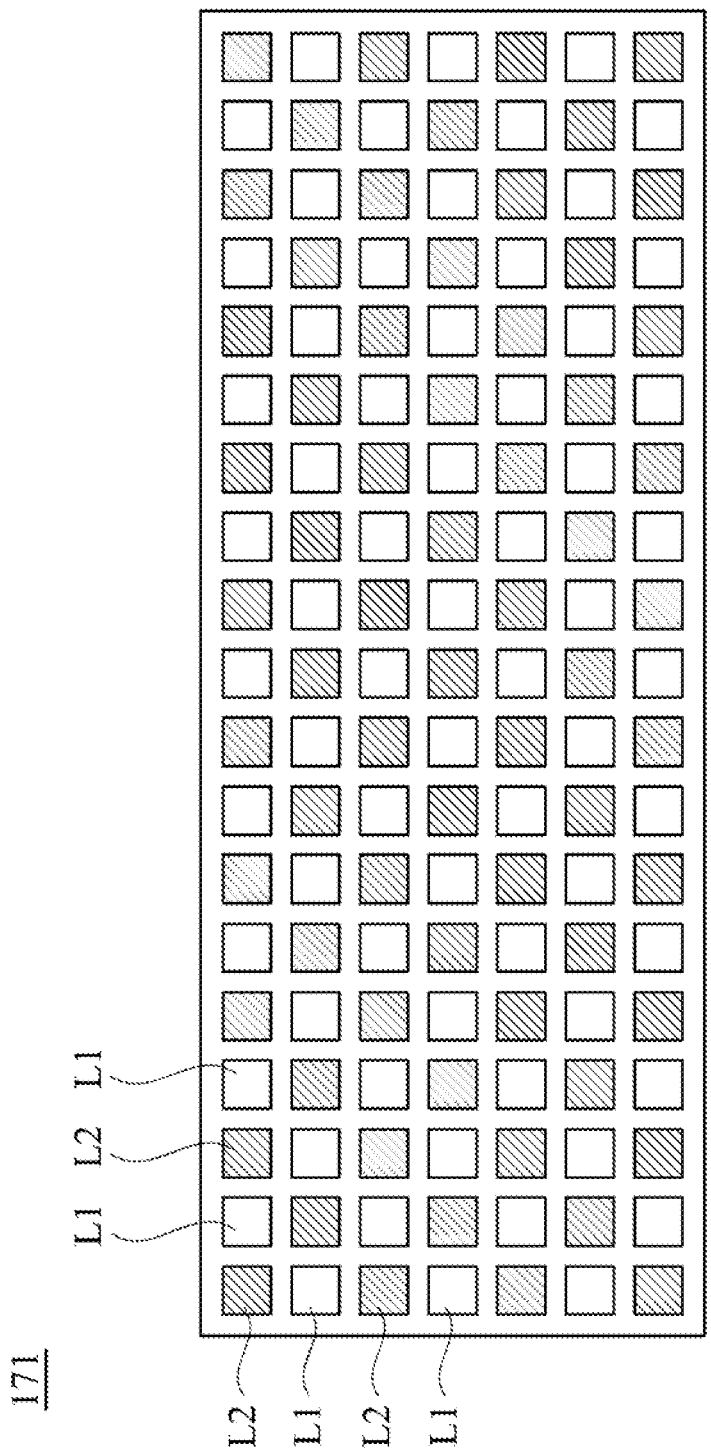

Reference is made to FIG. 15 to FIG. 17. FIG. 15 to FIG. 17 are schematic diagrams illustrating boards 151, 161 and 171 according to some embodiments of the present disclosure. In the embodiments of FIG. 15 to FIG. 17, the number of the light emitting elements L1 is equal to/similar with the number of the light emitting elements L2, and the two closest light emitting elements L2 are separated by one light emitting element L1. In other embodiments, the number of the light emitting elements L1 is greater than the number of the light emitting elements L2, and the two closest light emitting elements L2 are separated by multiple light emitting elements L1.

In embodiments of FIG. 15, the board 151 is a circular board, and the light emitting elements L1 and L2 are alternately arranged on the board 151.

In embodiments of FIG. 16, the board 161 is a square board, and the light emitting elements L1 and L2 are alternately arranged on the board 161.

In embodiments of FIG. 17, the board 171 is a rectangular board, and the light emitting elements L1 and L2 are alternately arranged on the board 171.

Reference is made to FIG. 18 to FIG. 21. FIG. 18 to FIG. 21 are schematic diagrams illustrating lamps 184, 194, 204 and 214 according to some embodiments of the present disclosure. The lamp 14 in FIG. 1 can be implemented by the lamp 184, 194, 204 and 214 in FIG. 18 to FIG. 21.

Figure 18:
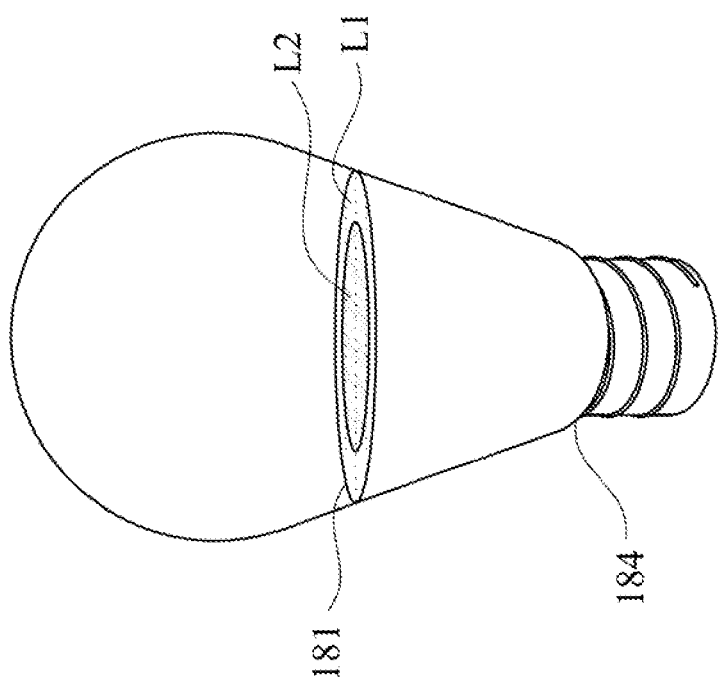

In the embodiments of FIG. 18, the lamp 184 is implemented by a bulb shape lamp, and the board 181 can be implemented by a circular board.

Figure 19:
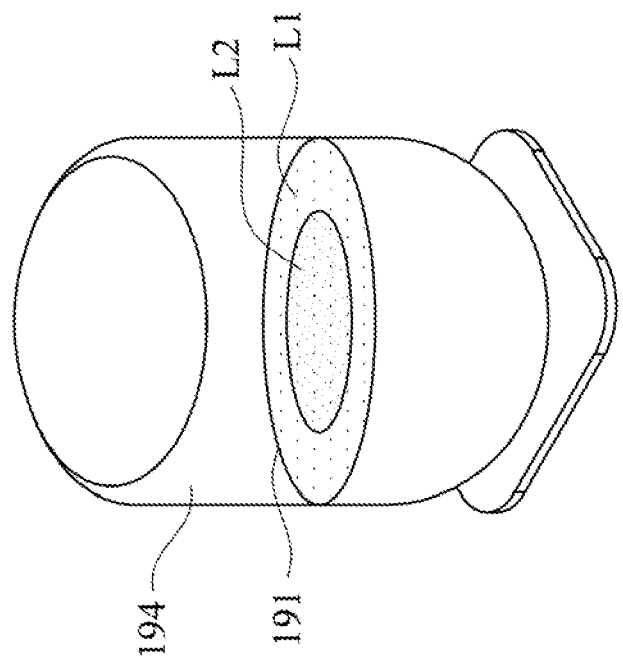
FIG. 18 to FIG. 21 are schematic diagrams illustrating lamps according to some embodiments of the present disclosure.

In the embodiments of FIG. 19, the lamp 194 is implemented by a desk lamp, and the board 191 can be implemented by a circular board.

Figure 20:
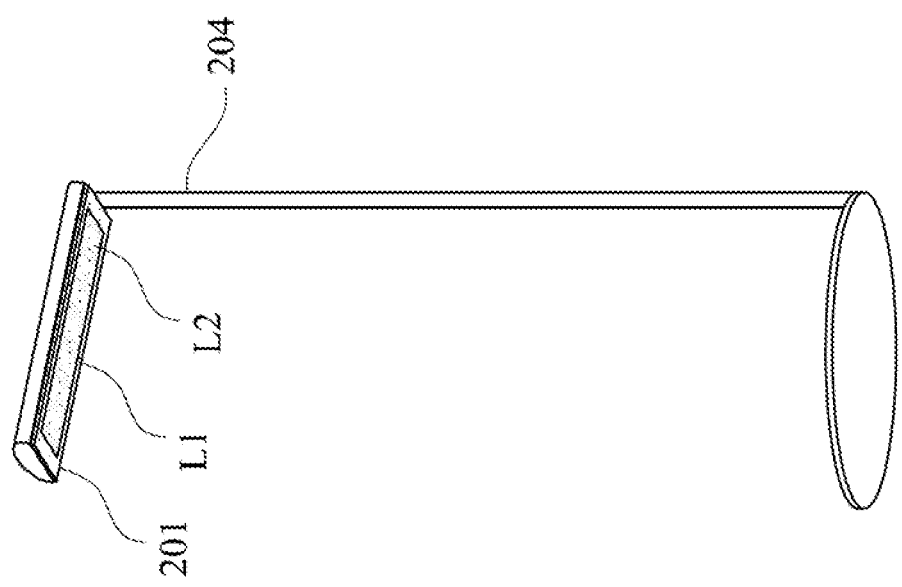

In the embodiments of FIG. 20, the lamp 204 is implemented by a floor lamp, and the board 201 can be implemented by a rectangular board.

Figure 21:
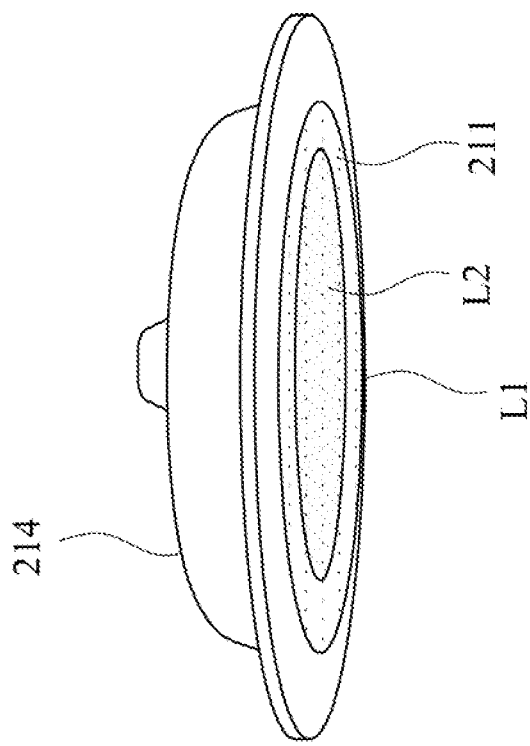

In the embodiments of FIG. 21, the lamp 214 is implemented by a recessed lamp, and the board 211 can be implemented by a circular board.

In other embodiment, the boards 181~211 of the lamps 184~214 in FIG. 18 to FIG. 21 can be implemented by the boards 41~141 in FIG. 4 to FIG. 14, which is not limited in the present disclosure. In some embodiments, any one of the above said board can be implemented by circular, oval, square, rectangular, triangular, strip shape or polygonal board, which is not limited in the present disclosure.

In summary, the lighting device 10 of the present disclosure is configured with the light emitting elements L1 and L2 which emit lights in different spectral ranges, so as to provide the heath care and reduce the strength of negative afterimages caused from the visual fatigue at the same time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A lighting device, comprising:
    a board;
    a plurality of first light emitting elements, emit lights in a first spectral range, wherein the first spectral range is a range of white light spectrum;
    a plurality of second light emitting elements, emit lights in a second spectral range, wherein the second spectral range is narrower than the first spectral range, wherein the second spectral range is a range of red light spectrum, wherein the second spectral range is within the range of 600 nanometers to 700 nanometers, wherein the first light emitting elements are disposed in at least one first region of the board, wherein the second light emitting elements are disposed in a plurality of second regions of the board, wherein the at least one first region and the second regions are alternately arranged on the board, and wherein the first light emitting elements in the at least one first region and the second light emitting elements in the second regions are arranged in two-color checkerboard pattern on the board;
    a light dimming device, electrically coupled to the first light emitting elements and the second light emitting elements, wherein the light dimming device is configured to:
    in a health care mode, control the first light emitting elements to emit lights having greater luminous intensity and control the second light emitting elements to emit lights having less luminous intensity; and
    a plurality of third light emitting elements, wherein the third light emitting elements are disposed in a third region of the board, and wherein the at least one first region and the second regions are surround by the third region.

2. The lighting device as claimed in claim 1, wherein the third light emitting elements emit lights in the first spectral range.

3. The lighting device as claimed in claim 2, wherein shapes of the at least one first region and the second regions are square or rectangular.

4. The lighting device as claimed in claim 2, wherein the at least one first region and the second regions are alternately arranged in a row interleaved pattern on the board.

5. The lighting device as claimed in claim 1, wherein the at least one first region and the second regions are alternately arranged in a checkerboard pattern on the board.

6. The lighting device as claimed in claim 1, wherein the at least one first region and the second regions are alternately arranged in a honeycomb pattern on the board.

7. The lighting device as claimed in claim 1, wherein the first spectral range is within the range of 400 nanometers to 800 nanometers.

8. The lighting device as claimed in claim 1, wherein the first light emitting elements have a color temperature between 2700K~6500K and cooperate with the second light emitting elements to make the lighting device emit with a color temperature above 1500K.

9. The lighting device as claimed in claim 1, wherein the first light emitting elements are disposed in the at least one first region of the board with a first density, wherein the second light emitting elements are disposed in the second regions of the board with a second density, wherein ratio of the first density to the second density is between 1 to 1 and 100 to 1.

* * * * *